US012062850B2

(12) United States Patent
Rumreich et al.

(10) Patent No.: US 12,062,850 B2
(45) Date of Patent: Aug. 13, 2024

(54) BROADBAND MULTI-TAP SLOT ANTENNA

(71) Applicant: The Boeing Company, Chicago, IL (US)

(72) Inventors: Marlow Lynn Rumreich, Kent, WA (US); Matthew G. Rivett, Seattle, WA (US); Thomas P. Delfeld, Newcastle, WA (US)

(73) Assignee: The Boeing Company, Chicago, IL (US)

( * ) Notice: Subject to any disclaimer, the term of this patent is extended or adjusted under 35 U.S.C. 154(b) by 253 days.

(21) Appl. No.: 17/722,168

(22) Filed: Apr. 15, 2022

(65) Prior Publication Data

US 2023/0335910 A1 Oct. 19, 2023

(51) Int. Cl.
*H01Q 13/18* (2006.01)
*H01Q 1/28* (2006.01)

(52) U.S. Cl.
CPC ............... *H01Q 13/18* (2013.01); *H01Q 1/28* (2013.01)

(58) Field of Classification Search
CPC ........ H01Q 13/18; H01Q 13/106; H01Q 1/28; H01Q 1/286; H01Q 5/25; H01Q 5/328
See application file for complete search history.

(56) References Cited

U.S. PATENT DOCUMENTS 8,643,566 B2 2/2014 Delfeld et al.
2010/0231470 A1* 9/2010 Lee .................... H01Q 15/0086 216/13
2011/0148727 A1* 6/2011 Chang .................. H01Q 13/206 343/777
2014/0139385 A1* 5/2014 Yoon .................... H01Q 9/0414 343/904
2022/0336955 A1* 10/2022 Lebaron ................. H01Q 1/273

* cited by examiner

*Primary Examiner* — Awat M Salih
(74) *Attorney, Agent, or Firm* — Jordan IP Law, LLC

(57) ABSTRACT

Systems, apparatuses and methods may provide for an antenna system including a cavity and a broadband antenna coupled to the cavity. The broadband antenna may include surfaces defining a slot, wherein a cross-section of the cavity defines a resonant frequency range of the slot. The broadband antenna may also include a plurality of transmission lines, wherein the plurality of transmission lines bridge the slot and are spaced apart at a sub-wavelength distance with respect to a target frequency range of the antenna system. Additionally, the broadband antenna may include a plurality of inductive tuning elements, each inductive tuning element being disposed adjacent to one of the plurality of transmission lines, wherein the target frequency range is a function of the resonant frequency range and an impedance associated with the plurality of inductive tuning elements.

14 Claims, 11 Drawing Sheets

600

601

BROADBAND MULTI-TAP SLOT ANTENNA

TECHNICAL FIELD

Embodiments generally relate to antennas. More particularly, embodiments relate to broadband multi-tap slot antennas.

BACKGROUND

Modern aircraft use antennas to transmit and receive information in the form of radio frequency (RF) energy. Due to space constraints, efforts have been made to reduce the size of aircraft antennas. Small antennas, however, tend to be either narrow band (e.g., limited operating frequency) or inefficient (e.g., relatively low gain).

SUMMARY

In accordance with one or more embodiments, an antenna system comprises a cavity and a broadband antenna coupled to the cavity, the broadband antenna including surfaces defining a slot, wherein a cross-section of the cavity defines a resonant frequency range of the slot. The broadband antenna also includes a plurality of transmission lines, wherein the plurality of transmission lines bridge the slot and are spaced apart at a sub-wavelength distance with respect to a target frequency range of the antenna system, and a plurality of inductive tuning elements, each tuning element being disposed adjacent to one of the plurality of transmission lines, wherein the target frequency range is a function of the resonant frequency range and an impedance associated with the plurality of inductive tuning elements.

In accordance with one or more embodiments, an aircraft comprises an airframe and an antenna system coupled to the airframe. The antenna system includes a cavity and a broadband antenna, the broadband antenna including surfaces defining a slot, wherein a cross-section of the cavity defines a resonant frequency range of the slot. The broadband antenna also includes a plurality of transmission lines, wherein the plurality of transmission lines bridge the slot and are spaced at a sub-wavelength distance with respect to a target frequency range of the antenna system, and a plurality of inductive tuning elements, each inductive tuning element being disposed adjacent to one of the plurality of transmission lines, wherein the target frequency range is a function of the resonant frequency range and an impedance associated with the plurality of tuning elements.

In accordance with one or more embodiments, a method of fabricating an antenna system comprises providing a cavity and coupling a broadband antenna to the cavity, the broadband antenna including surfaces defining a slot, wherein a cross-section of the cavity defines a resonant frequency range of the slot. The broadband antenna also including a plurality of transmission lines, wherein the plurality of transmission lines bridge the slot and are spaced apart at a sub-wavelength distance with respect to a target frequency range of the antenna system, and a plurality of inductive tuning elements, each inductive tuning element being disposed adjacent to one of the plurality of transmission lines, wherein the target frequency range is a function of the resonant frequency range and an impedance associated with the plurality of inductive tuning elements.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
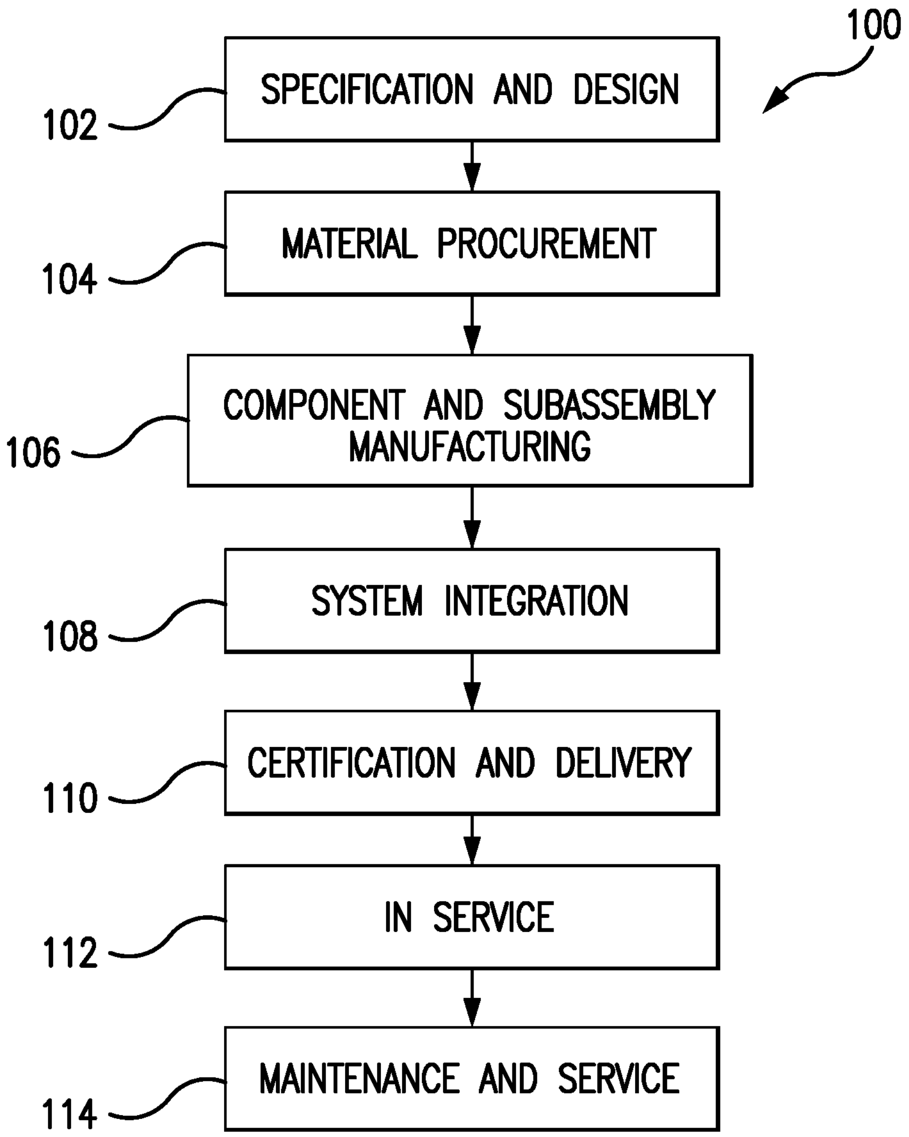
FIG. 1 is a block diagram of an example of a method of manufacturing and servicing an aircraft according to an embodiment.
Figure 2:
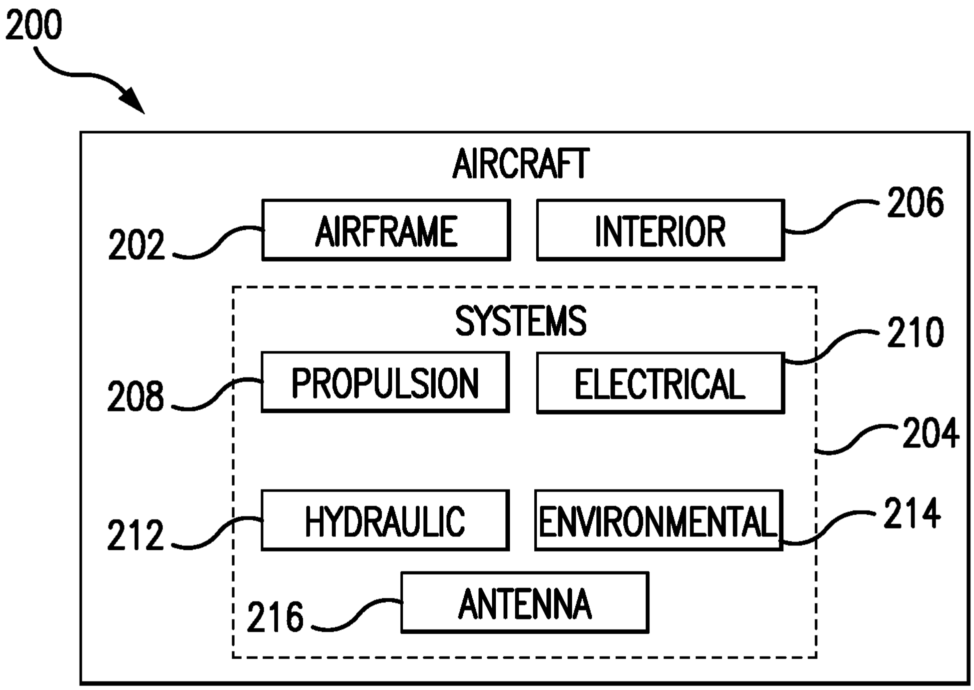
FIG. 2 is a block diagram of an example an aircraft according to an embodiment.
Figure 3:
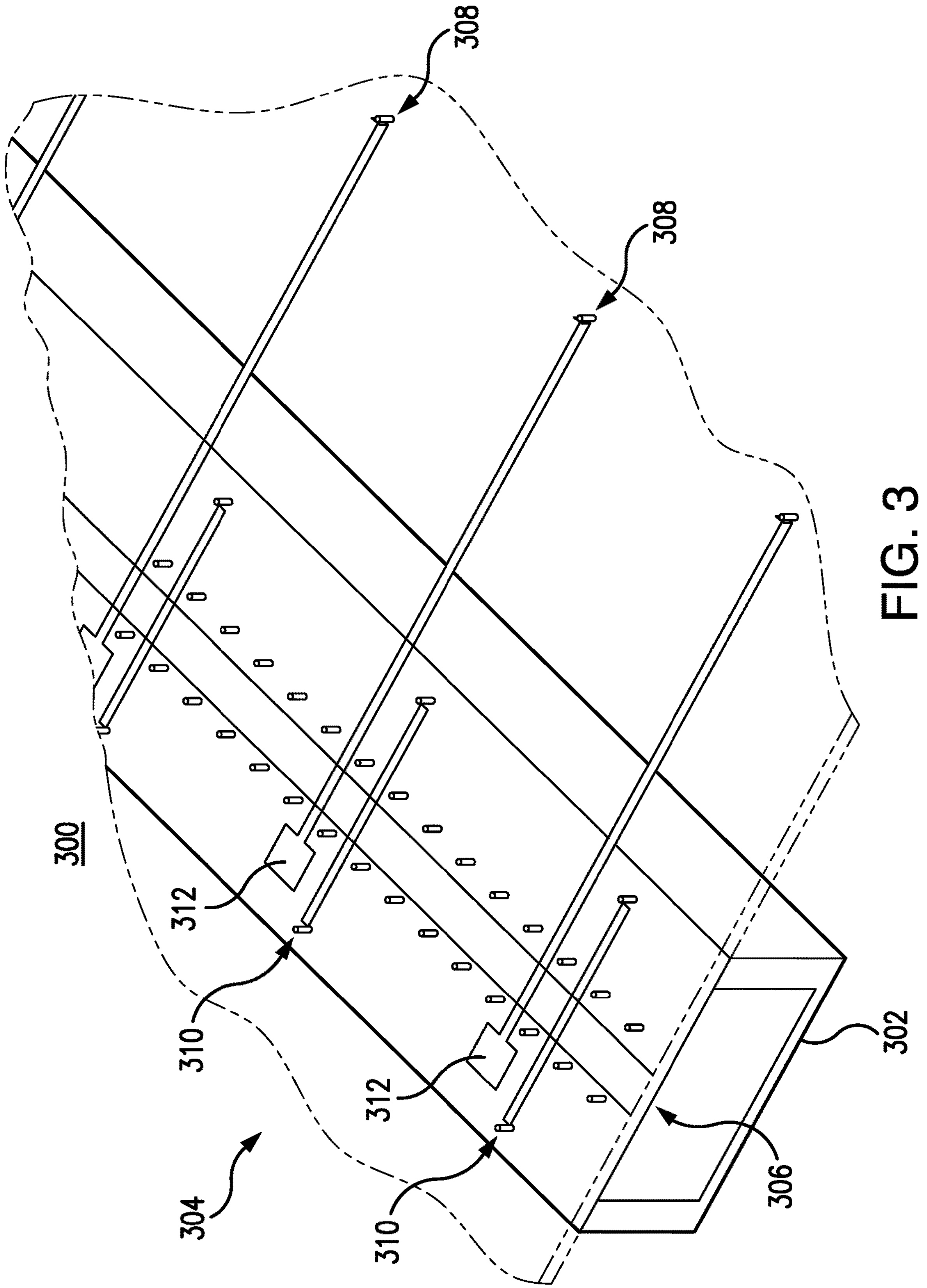
FIG. 3 is a perspective view of an example of an antenna system according to an embodiment.

Turning now to FIGS. 1 and 2, a method 100 of manufacturing and servicing an aircraft 200 is shown. During pre-production, the method 100 may include a specification and design stage (e.g., procedure, process) 102 of the aircraft 200 and a material procurement stage 104. During production, a component and subassembly manufacturing stage 106 and system integration stage 108 of the aircraft 200 takes place. Thereafter, the aircraft 200 may go through a certification and delivery stage 110 in order to be placed in service 112 (e.g., by a customer). While in service 112, the aircraft 200 is scheduled for a routine maintenance and service stage 114, which may include modification, reconfiguration, refurbishment, and other maintenance or service.

Each of the processes of the method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

The aircraft 200 may include an airframe 202 with a plurality of systems 204 and an interior 206. Examples of the systems 204 include one or more of a propulsion system 208, an electrical system 210, a hydraulic system 212, an environmental system 214, and an antenna system 216. Any number of other systems may be included. Although an aerospace example is shown, different advantageous embodiments may be applied to other industries, such as the automotive industry and the ship building industry.

Technology embodied herein may be employed during any one or more of the aspects of the method 100. For example, components or subassemblies produced in the component and subassembly manufacturing stage 106 may be fabricated or manufactured in a manner similar to components or subassemblies produced while the aircraft 200 is in service 112.

Also, one or more apparatus embodiments, method embodiments, or a combination thereof may be utilized during production processes, such as the component and subassembly manufacturing stage 106 and the system integration stage 108, for example, without limitation, by substantially expediting the assembly of or reducing the cost of the aircraft 200. Similarly, one or more of apparatus embodiments, method embodiments, or a combination thereof may be utilized while the aircraft 200 is in service 112 or during the maintenance and service stage 114.

For example, the antenna system 216 may include one or more broadband multi-tap slot antennas constructed according to an advantageous technology described herein may be designed for the aircraft 200 during the specification and design stage 102. Further, an advantageous embodiment may be used to implement a broadband multi-tap slot antenna during the component and subassembly manufacturing stage 106 and the system integration stage 108. As yet another example, a broadband multi-tap slot antenna according to an advantageous embodiment may be used during in service 112.

The different advantageous embodiments recognize that existing antennas have low gain or require a large size to obtain targeted bandwidths. As a result, a balance in reducing antenna size may be made between choosing lower gain for a larger bandwidth. Another choice may be to increase the size of the antenna to obtain a targeted gain.

With currently used antennas, the conductor may be made out of a material that provides surface resistivity in ohms per square. With this type of resistivity, increased bandwidth may be obtained, but with losses in gain.

Figure 6:
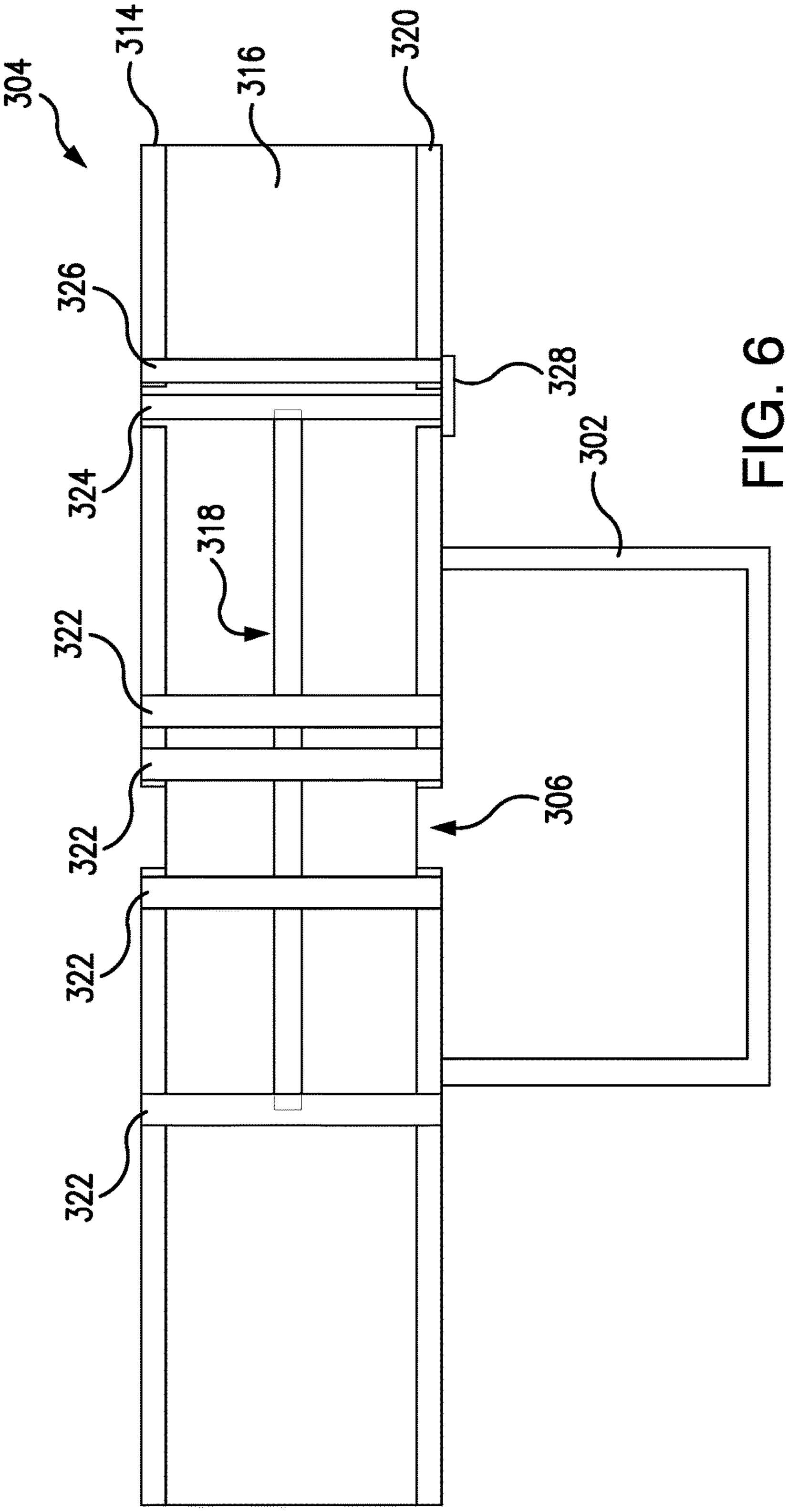
FIG. 6 is an enlarged end view of an example of an antenna system according to an embodiment.
Figure 7:
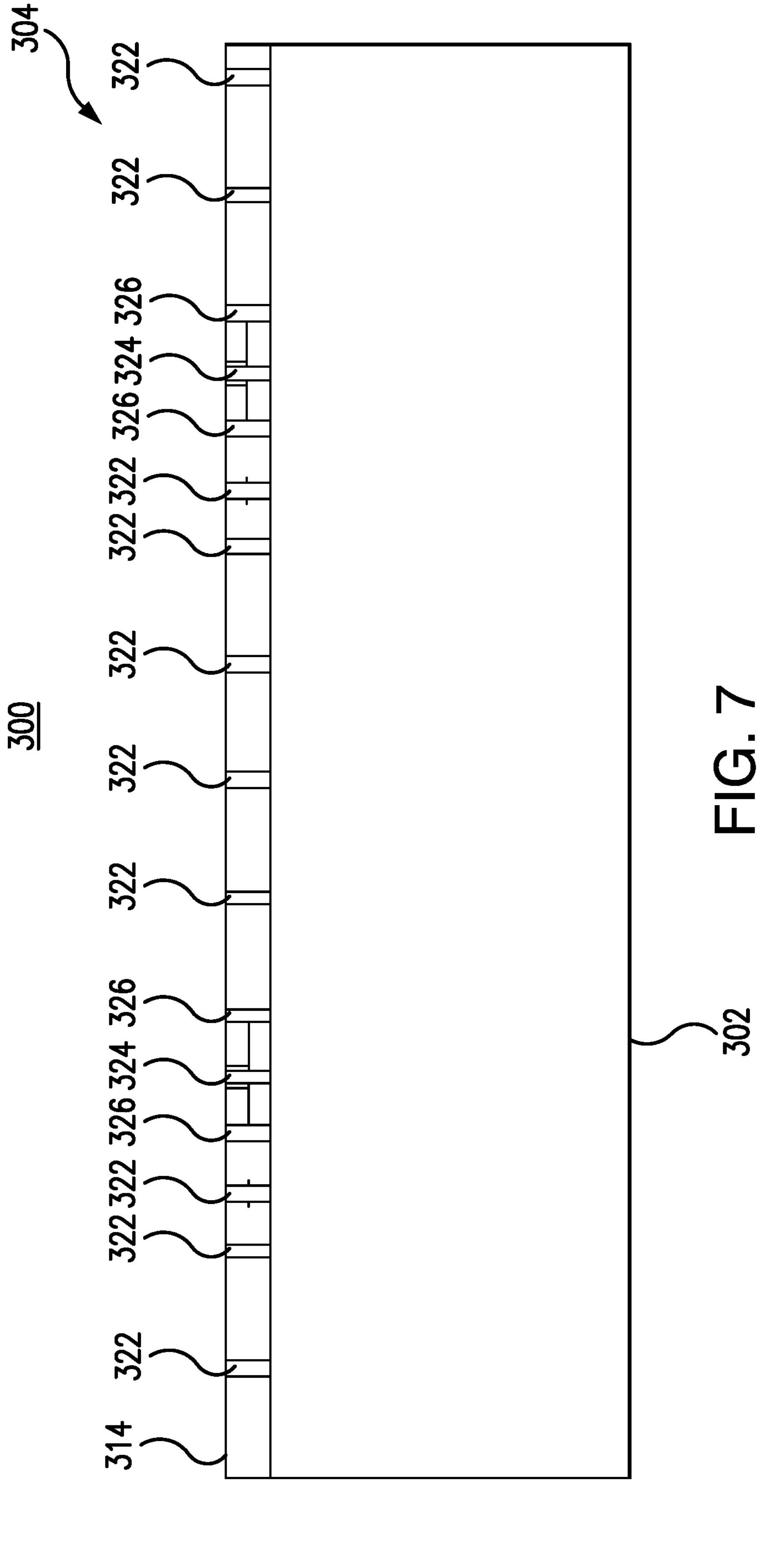
FIG. 7 is a side view of an example of an antenna system according to an embodiment.

FIGS. 3-7 show an antenna system 300 that may be readily incorporated into the antenna system 216 (FIG. 2), already discussed. The antenna system 300 includes a cavity 302 and a broadband antenna 304 coupled to the cavity 302. The broadband antenna 304 may be coupled to an airframe such as, for example, the airframe 202 (FIG. 2). As best shown in FIG. 6, the broadband antenna 304 includes an upper copper layer 314, a dielectric 316, a center copper layer 318, and a lower copper layer 320 having surfaces defining a slot 306. Vias 322 interconnect the upper copper layer 314 with the lower copper layer 320 (e.g., ground). Additionally, a feed pin 324 of a connector 328 may be electrically connected to the center copper layer 318 and electrically isolated from the upper copper layer 314 and the lower copper layer 320. In an embodiment, a ground pin 326 of the connector 328 is electrically connected to the upper copper layer 314 and the lower copper layer 320.

As will be discussed in greater detail, the cross-section of the cavity 302 defines a resonant frequency range of the slot 306. The center copper layer 318 of the broadband antenna 304 includes a plurality of transmission lines 308 (FIG. 4), wherein the plurality of transmission lines 308 bridge the slot 306 and are spaced apart at a sub-wavelength distance with respect to a target (e.g., desired tuned) frequency range of the antenna system 300. Each of the transmission lines 308 may represent a tap so that the plurality of transmission lines 308 include a multi-tap arrangement that enables dissipative losses to be recovered (e.g., improving efficiency by combining power received from the plurality of taps).

In an embodiment, the sub-wavelength distance is a fraction of the highest frequency in the target frequency range. Thus, if the target frequency range is 1.0 Gigahertz (GHz) to 4.0 GHz, the sub-wavelength distance might be on the order of 7.5 millimeters (mm, e.g., with λ=C/f, where λ is the wavelength in meters (m), C is the speed of light in m/second (m/s) and f is the frequency). Indeed, selecting the fraction to be less than 50% may enhance the directivity of the antenna system 300. More particularly, at half the wavelength the taps can provide a wide variety of functions or be combined for higher gain at the expense of beamwidth. Thus, the wavelength at 4 GHz is 75 mm, which would yield 37.5 mm for a sub-wavelength distance. Another example might have a period of 25.4 mm for a 1-4 GHz range, where 7.5 mm is also a sub-wavelength distance.

Figure 4:
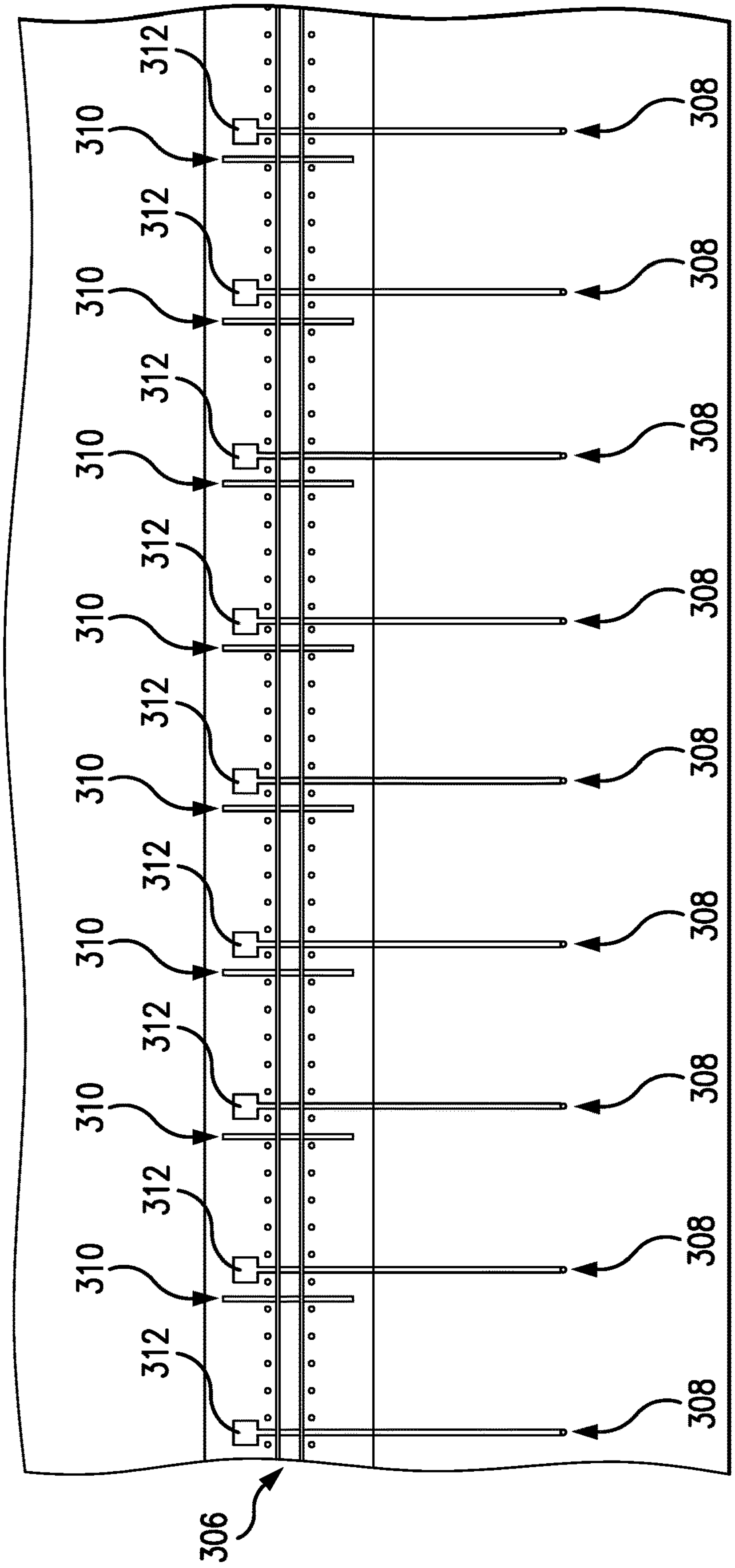
FIG. 4 is a plan view of an example of an antenna system according to an embodiment.
Figure 5:
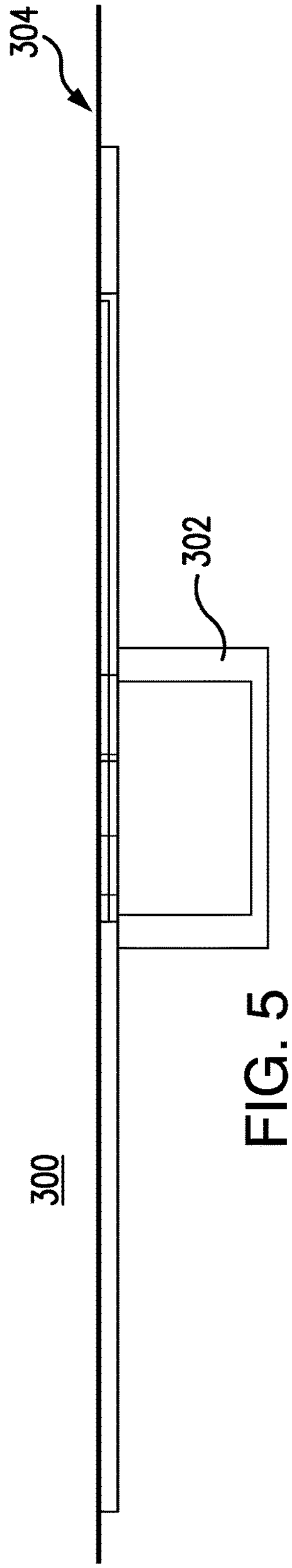
FIG. 5 is an end view of an example of an antenna system according to an embodiment.

The center copper layer 318 of the broadband antenna 304 also includes a plurality of inductive tuning elements 310 (FIG. 4). Each inductive tuning element 310 is disposed adjacent to one of the transmission lines 308, wherein the target frequency range of the antenna system 300 is a function of the resonant frequency range of the slot 306 and an impedance associated with the plurality of inductive tuning elements 310. In one example, the impedance includes an inductance value that is a function of the length of the plurality of inductive tuning elements 310. As will be discussed in greater detail, the antenna system 300 may also include a circuit (not shown) coupled to the plurality of inductive tuning elements 310, wherein the circuit adjusts the inductance value (e.g., after manufacturing). The center copper layer 318 of the broadband antenna 304 may also include a plurality of capacitive patches 312 (FIG. 4). In the illustrated example, each capacitive patch 312 is coupled to an end of one of the plurality of transmission lines 308 and disposed adjacent to one of the inductive tuning elements 310. Accordingly, the impedance also includes a capacitance value of the plurality of capacitive patches 312.

More particularly, the input impedance per tap of an infinitely long, uniformly loaded slot antenna with no cavity 302 (e.g., open on both sides) has been calculated in closed form using a single unknown Galerkin method of the dual problem (e.g., strip in free space) as:

$$Z_{slot} = \frac{\eta_0^2}{4Z_{strip}} = \frac{1}{\frac{k_0}{\eta_0}p\left[1 - \frac{2i}{\pi}\ln\left(k_0\frac{\gamma w}{8}\right)\right]}$$

Where $\eta_0$ is the wave impedance in free space, $k_0$ is the wave number in free space, p is the period, γ is Euler's constant, and w is the width of the slot 306. This impedance is a per tap impedance that is capacitive in nature with a relatively high real part. Since the only losses are radiative, the antenna is 100% efficient when conjugate matched.

Typical RF electronics use a 50 ohm impedance, so a goal is to have the slot 306 appear to be a 50 ohm load. This objective is achieved via two technological features as follows.

An inductance is placed in an electrically parallel relationship with the slot 306 to make the real part of the impedance 50 ohms/tap at the target (e.g., desired tuned) frequency. The illustrated cavity 302 behind the slot 306 provides this inductance and is accurately represented by a single turn solenoid (λ*A/p) where μ is the permeability of the cavity 302, p is the tap period and A is the area of the cavity 302. Controlling the inductance of the cavity 302, which may be over-sized, so an additional inductance in the form of the inductive tuning elements 310 is added in parallel to achieve the 50 ohm condition. The additional inductance can be electronically adjusted or fixed in the printed circuit board of the broadband antenna 304. The resulting impedance of the slot 306 with this parallel inductance is now 50 ohms in series with some inductive reactance, which was capacitive before the addition of the parallel inductance.

A series capacitance is added to cancel the inductive reactance at the tuned frequency. This capacitance can be either fixed by the capacitive patches 312 in the printed circuit board of the broadband antenna 304 or an electronic element that may be electronically controlled. The resulting input impedance at the tuned frequency is now 50 ohms and is theoretically 100% efficient when connected to the 50 ohm transmission lines 308 and a 50 ohm load.

Figure 8:
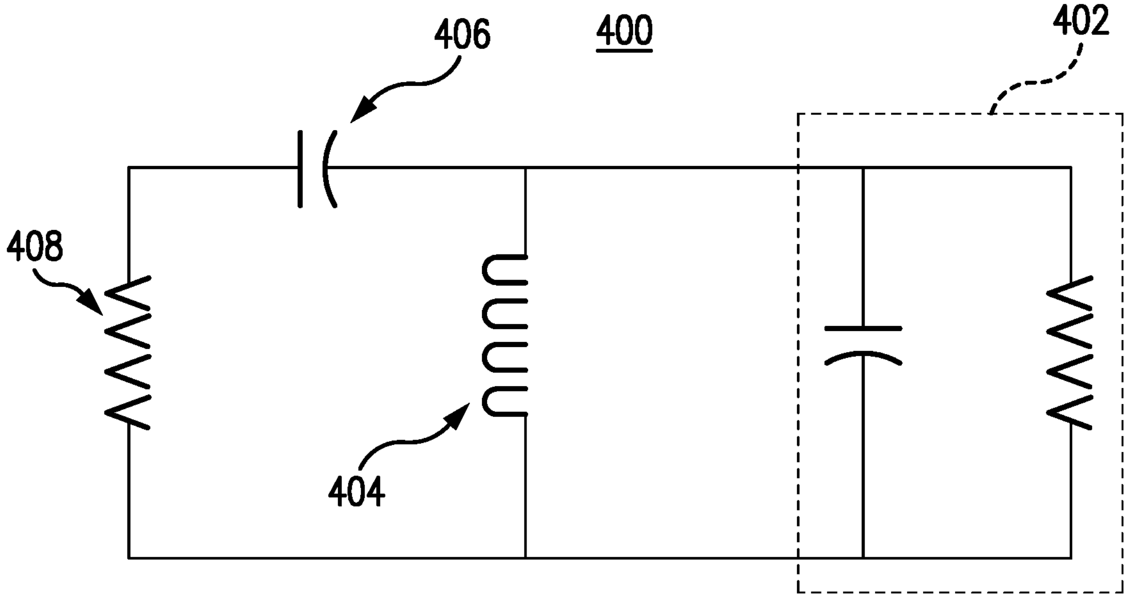
FIG. 8 is a schematic diagram of an example of a model of an antenna system according to an embodiment.

FIG. 8 shows a circuit model 400 of an antenna system such as, for example, the antenna system 300 (FIGS. 3-7), already discussed. In the illustrated example, an antenna portion 402 includes a per tap impedance that is capacitive in nature with a relatively high real part. An inductance 404 is placed in an electrically parallel relationship with the antenna portion 402 to make the real part of the impedance 50 ohms/tap at the target (e.g., desired tuned) frequency. As already noted, the cavity behind the slot provides this inductance and is accurately represented by a single turn solenoid. If the cavity is over-sized, an additional inductance in the form of the inductive tuning elements 310 (FIGS. 3-7) is added in parallel to achieve the 50 ohm condition. The additional inductance can be electronically adjusted or fixed in the printed circuit board of the broadband antenna. The resulting impedance of the slot with this parallel inductance is now 50 ohms in series with some inductive reactance, which was capacitive before the addition of the parallel inductance 404.

A series capacitance 406 is added to cancel the inductive reactance at the tuned frequency. This capacitance 406 can be either fixed by the capacitive patches 312 (FIGS. 3-7) in the printed circuit board of the broadband antenna or an electronic element that may be electronically controlled. The resulting input impedance at the tuned frequency is now 50 ohms and is theoretically 100% efficient when connected to the 50 ohm transmission lines 308 and a 50 ohm load/feed 408.

Figure 9:
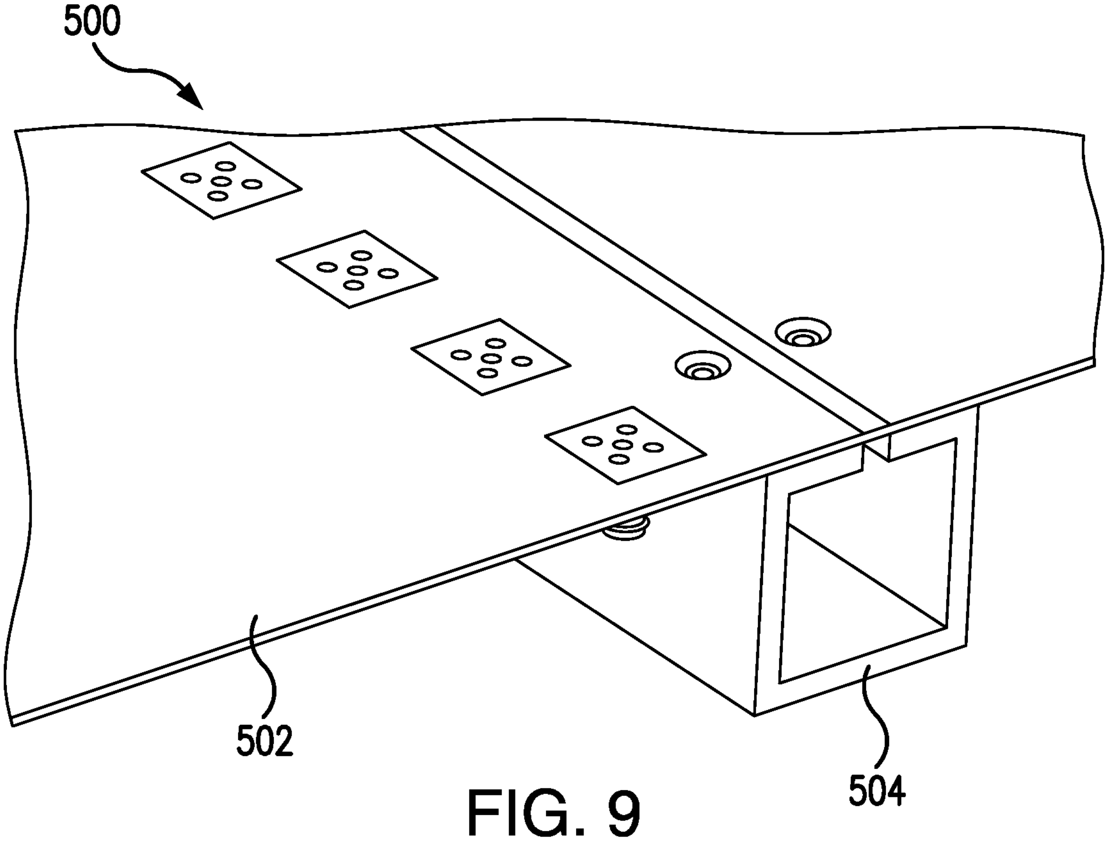
FIG. 9 is a perspective view of an example of connector feeds according to an embodiment.

FIG. 9 shows a plurality of connectors 500 that provide ground and signal connectivity to a broadband antenna 502 that is coupled to a cavity 504. In general, the four peripheral contacts of each connector 500 provide ground connectivity to the upper and lower copper layers of the broadband antenna 502 and the center contact of each connector 500 provides signal connectivity to the transmission lines in the central copper layer of the broadband antenna 502.

Figure 10A:
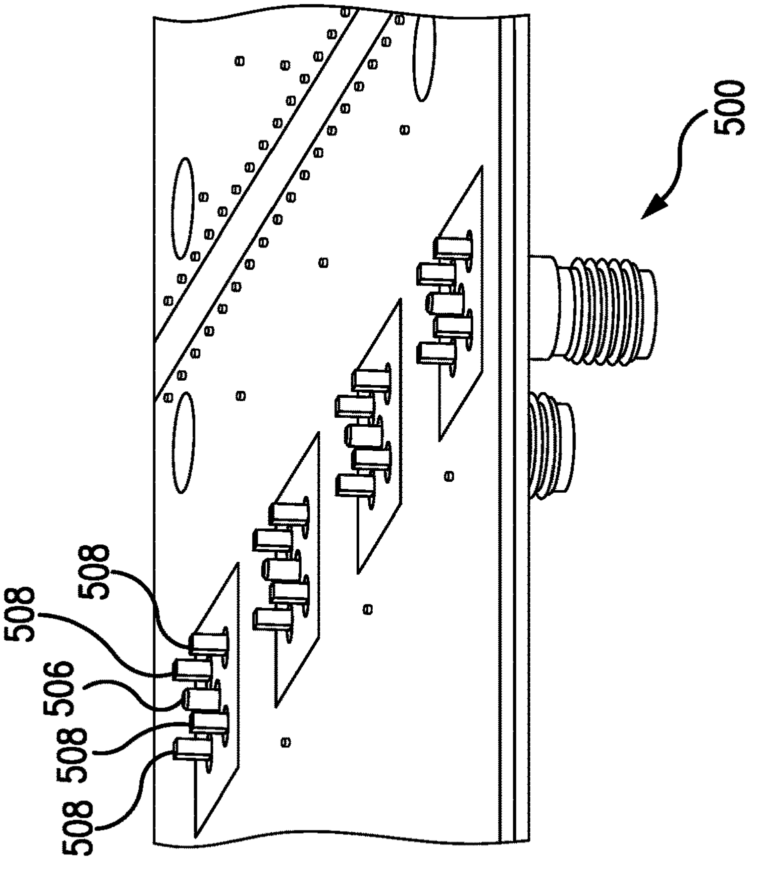
FIGS. 10A and 10B are perspective views of an example of a connector feed manufacturing sequence according to an embodiment.
Figure 10B:
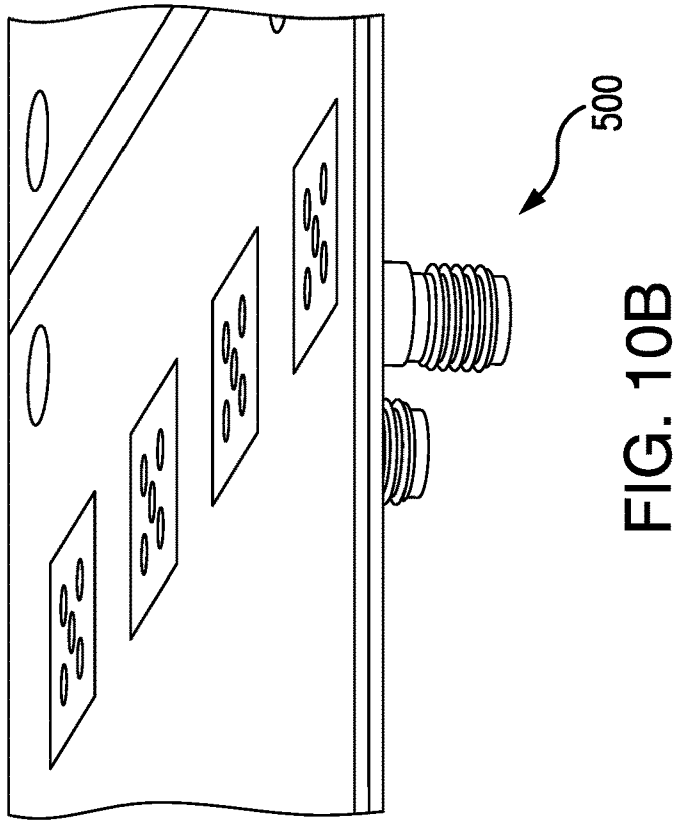

FIGS. 10A and 10B demonstrate that the connectors 500 may be coupled to the broadband antenna by soldering a surface mount assembly (SMA) to the circuit board of the broadband antenna. In the illustrated example, a center contact 506 is similar to the feed pin 324 (FIG. 6), already discussed, and peripheral contacts 508 are similar to the ground pins 326 (FIG. 6), already discussed. As best shown in FIG. 10B, the excess portion of the contacts 506, 508 may then be clipped.

Figure 11A:
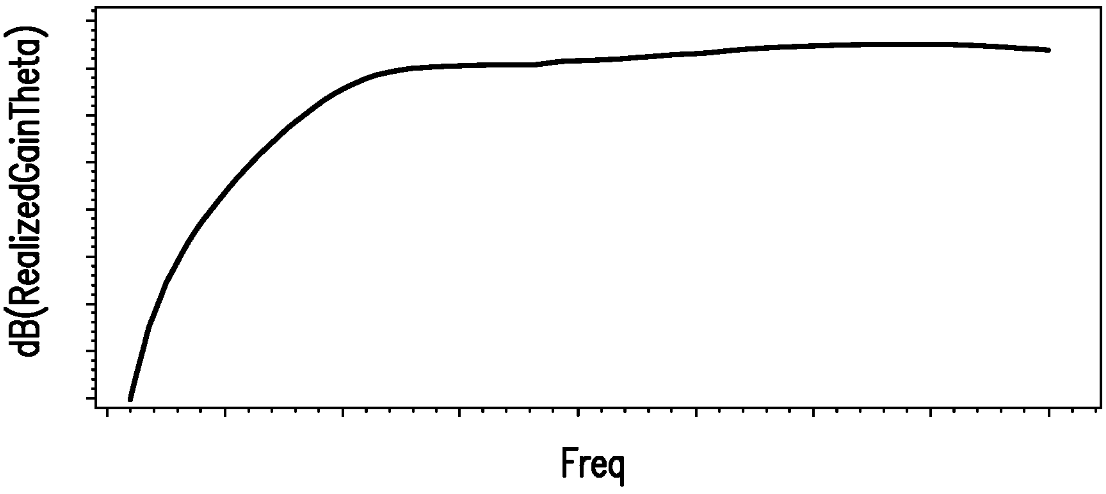
FIGS. 11A and 11B are plots of examples of gain versus frequency response curves according to embodiments.

FIG. 11A shows a gain plot 600 for an antenna system such as, for example, the antenna system 300 (FIGS. 3-7), already discussed. In the illustrated example, the gain is relatively high for a broad range of frequencies (e.g., 1 GHz-4 Ghz).

Figure 11B:
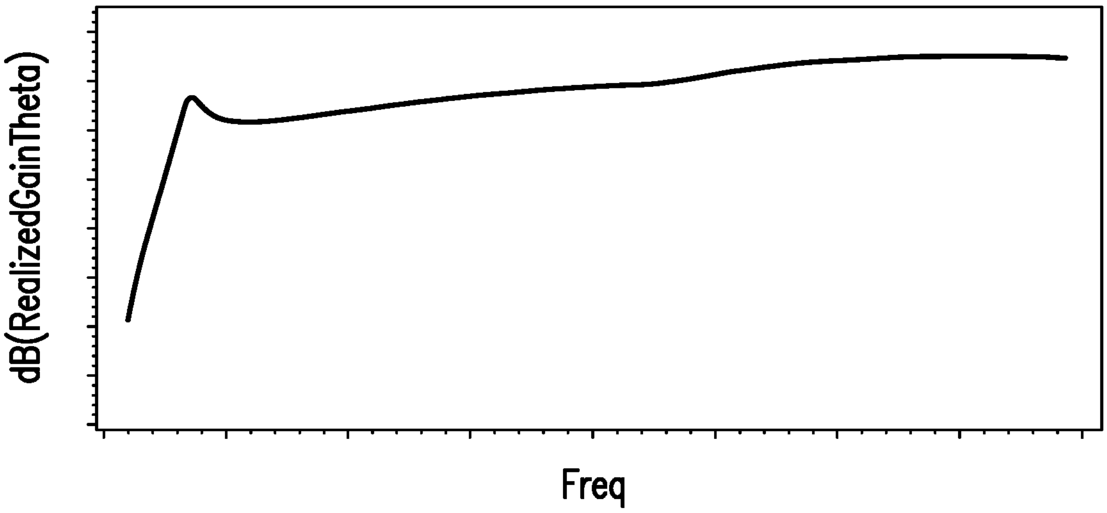

FIG. 11B shows a gain plot 601 for another antenna system with low-end tuning. The gain plot 601 is for an antenna including a cavity, slot, and capacitive patch, with no on-board inductive strip. An increase in the size of the cavity tuned the antenna to have a spike in gain at the low end of the band. This tuning demonstrates the broadband gain functionality of the antenna with a narrowband low frequency response.

Figure 12A:
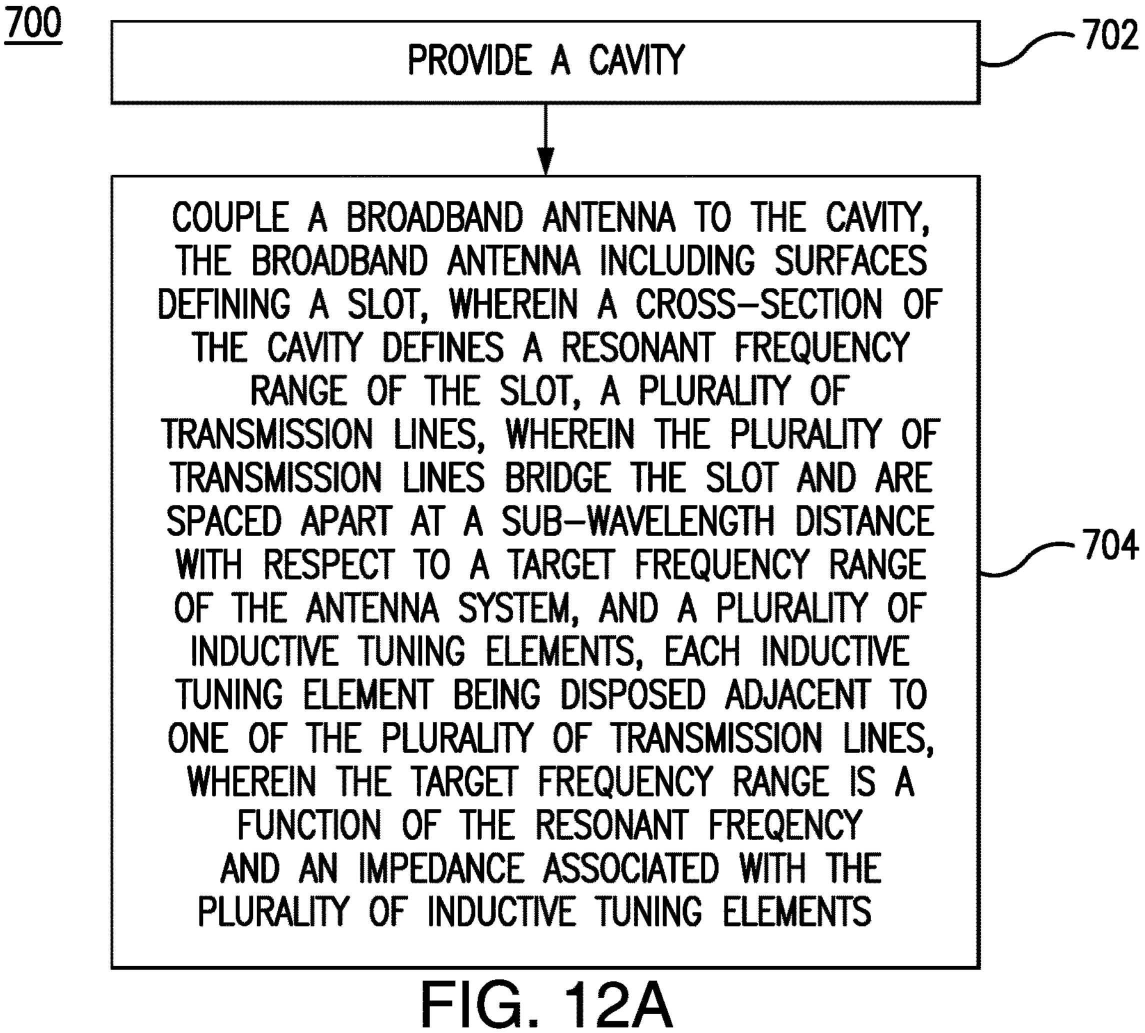
FIGS. 12A and 12B are flowcharts of examples of methods of fabricating an antenna system according to an embodiment.

FIG. 12A shows a method 700 of manufacturing an antenna system such as, for example, the antenna system 300 (FIGS. 3-7). The method 700 may generally be incorporated into the component and subassembly manufacturing stage 106 (FIG. 1) of an aircraft and/or while an aircraft 200 is in service 112 (FIG. 1) via circuit formation, mechanical assembly, metal stamping and/or semiconductor fabrication technology. More particularly, the method 700 may be implemented in one or more modules as a set of logic instructions stored in a machine- or computer-readable storage medium such as random access memory (RAM), read only memory (ROM), programmable ROM (PROM), firmware, flash memory, etc., in hardware, or any combination thereof. For example, hardware implementations may include configurable logic, fixed-functionality logic, or any combination thereof. Examples of configurable logic include suitably configured programmable logic arrays (PLAs), field programmable gate arrays (FPGAs), complex programmable logic devices (CPLDs), and general purpose microprocessors. Examples of fixed-functionality logic include suitably configured application specific integrated circuits (ASICs), combinational logic circuits, and sequential logic circuits. The configurable or fixed-functionality logic can be implemented with complementary metal oxide semiconductor (CMOS) logic circuits, transistor-transistor logic (TTL) logic circuits, or other circuits.

Illustrated processing block 702 provides a cavity and block 704 couples a broadband antenna to the cavity. In the illustrated example, the broadband antenna includes surfaces defining a slot, wherein a cross-section of the cavity defines a resonant frequency range of the slot. The broadband antenna also includes a plurality of transmission lines, wherein the plurality of transmission lines bridge the slot and are spaced apart at a sub-wavelength distance with respect to a target frequency range of the antenna system. Moreover, the broadband antenna includes a plurality of inductive tuning elements, wherein each inductive tuning element is disposed adjacent to one of the plurality of transmission lines. Additionally, the target frequency range is a function of the resonant frequency range and an impedance associated with the plurality of inductive tuning elements.

In one example, the sub-wavelength distance is a fraction of a highest frequency in the target frequency range. For example, the fraction may be less than fifty percent to improve the directivity of the broadband antenna. Additionally, the impedance may include an inductance that is a function of a length of the plurality of inductive tuning elements. Block 704 may also include coupling a circuit to the plurality of inductive tuning elements, wherein the circuit is to adjust the inductance value. In an embodiment, the plurality of transmission lines include a multi-tap arrangement that enables dissipative losses to be recovered (e.g., by combining power received from the plurality of taps). The method 700 enhances performance at least to the extent that incorporating the inductive tuning elements into the broadband antenna reduces the size of the antenna system while maintaining relatively high efficiency and a broadband frequency response.

Figure 12B:
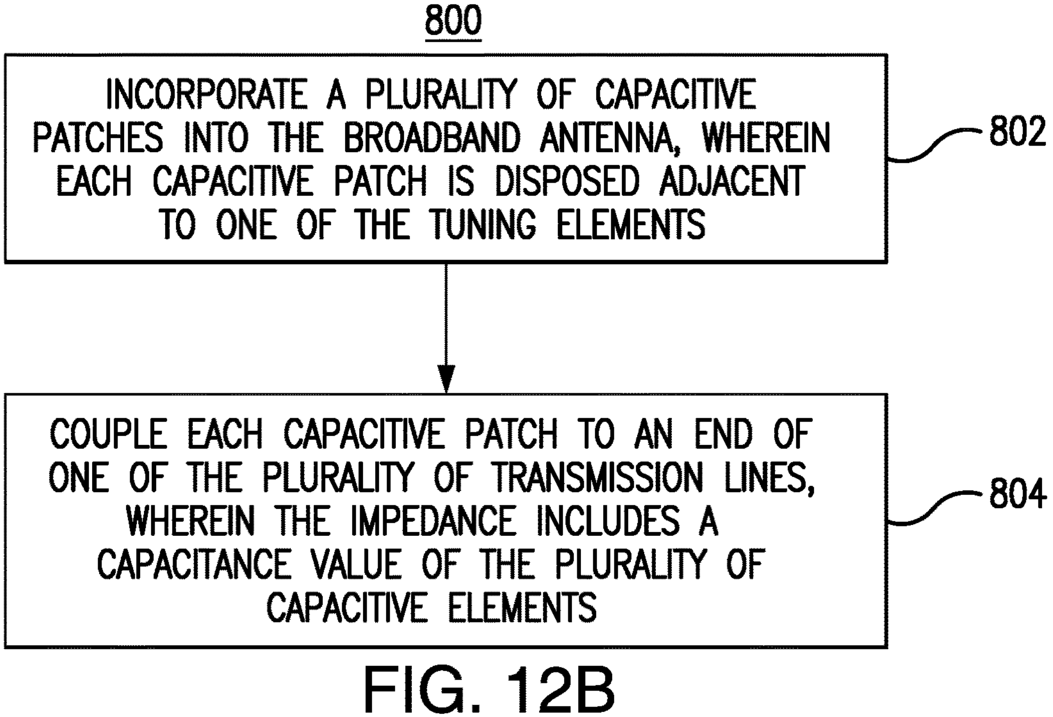

FIG. 12B shows a method 800 of configuring a broadband antenna. The method 800 may generally be incorporated into block 704 (FIG. 12A), already discussed. More particularly, the method 700 may be implemented in one or more modules as a set of logic instructions stored in a machine- or computer-readable storage medium such as RAM, ROM, PROM, firmware, flash memory, etc., in hardware, or any combination thereof. For example, hardware implementations may include configurable logic, fixed-functionality logic, or any combination thereof.

Illustrated processing block 802 incorporates a plurality of capacitive patches into the broadband antenna, wherein each capacitive patch is disposed adjacent to one of the tuning elements. Block 804 couples each capacitive patch to an end of one of the plurality of transmission lines, wherein the impedance further includes a capacitance value of the plurality of capacitive elements. The method 800 therefore further enhances performance at least to the extent that the capacitive patches cancel the inductive reactance at the tuned frequency.

Figure 13:
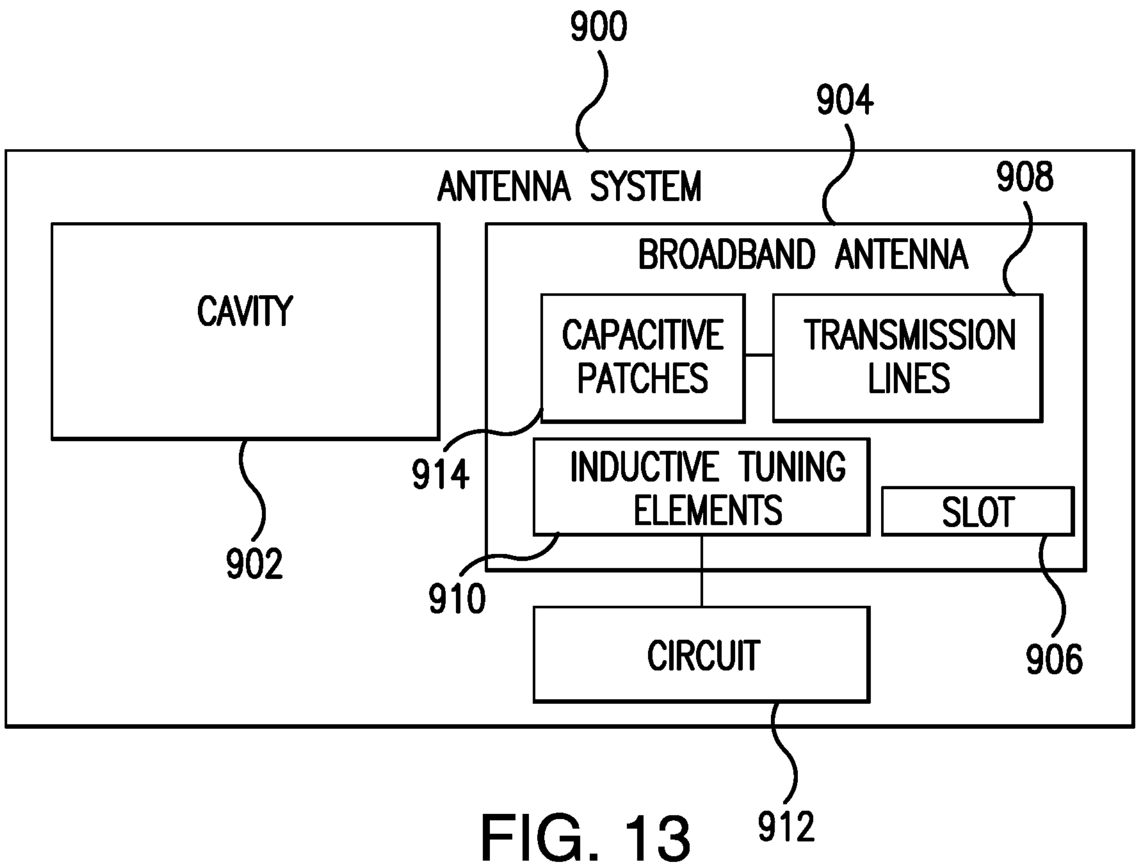
FIG. 13 is a block diagram of an example of an antenna system according to an embodiment.

FIG. 13 shows an antenna system 900 that may be readily incorporated into the antenna system 216 (FIG. 2), already discussed. Additionally, the antenna system 900 may be similar to the antenna system 300 (FIGS. 3-7), already discussed. In the illustrated example, the antenna system 900 includes a cavity 902 and a broadband antenna 904 coupled to the cavity. The broadband antenna 904 includes surfaces defining a slot 906, wherein a cross-section of the cavity 902 defines a resonant frequency range of the slot 906. The broadband antenna 904 also includes a plurality of transmission lines 908, wherein the plurality of transmission lines 908 bridge the slot 906 and are spaced apart at a sub-wavelength distance with respect to a target frequency range of the antenna system. Additionally, the broadband antenna 904 includes a plurality of inductive tuning elements 910. Each inductive tuning element 910 may be disposed adjacent to one of the plurality of transmission lines 908. As already noted, the target frequency range may be a function of the resonant frequency range of the slot 906 and an impedance associated with the plurality of inductive tuning elements 910.

In an embodiment, the sub-wavelength distance is a fraction (e.g., less than fifty percent) of a highest frequency in the target frequency range. Additionally, the impedance may include an inductance value that is a function of the length of the plurality of inductive tuning elements 910. In such a case, the antenna system 900 may further include a circuit 912 coupled to the plurality of inductive tuning elements, wherein the circuit 912 adjusts the inductance value (e.g., to change the target frequency range). In one example, the broadband antenna 904 further includes a plurality of capacitive patches 914, wherein each capacitive patch 914 is coupled to an end of one of the plurality of transmission lines 908. Each capacitive patch 914 may also be disposed adjacent to one of the inductive tuning elements 910. Thus, the impedance may further include the capacitance value of the plurality of capacitive patches 914. In an embodiment, the plurality of transmission lines 908 include a multi-tap arrangement that enables dissipative losses to be recovered.

Additional Notes and Examples:

Example one includes an antenna system comprising a cavity, and a broadband antenna coupled to the cavity, the broadband antenna including surfaces defining a slot, wherein a cross-section of the cavity defines a resonant frequency range of the slot, a plurality of transmission lines, wherein the plurality of transmission lines bridge the slot and are spaced apart at a sub-wavelength distance with respect to a target frequency range of the antenna system, and a plurality of inductive tuning elements, each inductive tuning element being disposed adjacent to one of the plurality of transmission lines, wherein the target frequency range is a function of the resonant frequency range and an impedance associated with the plurality of inductive tuning elements.

Example two includes the antenna system of example one, wherein the sub-wavelength distance is a fraction of a highest frequency in the target frequency range.

Example three includes the antenna system of example two, wherein the fraction is less than fifty percent.

Example four includes the antenna system of example one, wherein the impedance includes an inductance value that is a function of a length of the plurality of inductive tuning elements.

Example five includes the antenna system of example four, further including a circuit coupled to the plurality of inductive tuning elements, wherein the circuit is to adjust the inductance value.

Example six includes the antenna system of example one, wherein the broadband antenna further includes a plurality of capacitive patches, each capacitive patch being coupled to an end of one of the plurality of transmission lines and disposed adjacent to one of the inductive tuning elements, and wherein the impedance includes a capacitance value of the plurality of capacitive patches.

Example seven includes the antenna system of example one, wherein the plurality of transmission lines include a multi-tap arrangement that enables dissipative losses to be recovered.

Example eight includes an aircraft comprising an airframe, and an antenna system coupled to the airframe, wherein the antenna system includes a cavity, and a broadband antenna, the broadband antenna including surfaces defining a slot, wherein a cross-section of the cavity defines a resonant frequency range of the slot, a plurality of transmission lines, wherein the plurality of transmission lines bridge the slot and are spaced apart at a sub-wavelength distance with respect to a target frequency range of the antenna system, and a plurality of inductive tuning elements, each inductive tuning element being disposed adjacent to one of the plurality of transmission lines, wherein the target frequency range is a function of the resonant frequency range and an impedance associated with the plurality of inductive tuning elements.

Example nine includes the aircraft of example eight, wherein the sub-wavelength distance is a fraction of a highest frequency in the target frequency range.

Example ten includes the aircraft of example nine, wherein the fraction is less than fifty percent.

Example eleven includes the aircraft of example eight, wherein the impedance includes an inductance value that is a function of a length of the plurality of inductive tuning elements.

Example twelve includes the aircraft of example eleven, wherein the antenna system further includes a circuit coupled to the plurality of inductive tuning elements, wherein the circuit is to adjust the inductance value.

Example thirteen includes the aircraft of example eight, wherein the broadband antenna further includes a plurality of capacitive patches, each capacitive patch being coupled to an end of one of the plurality of transmission lines and disposed adjacent to one of the inductive tuning elements, and wherein the impedance includes a capacitance value of the plurality of capacitive patches.

Example fourteen includes the aircraft of example eight, wherein the plurality of transmission lines include a multi-tap arrangement that enables dissipative losses to be recovered.

Example fifteen includes a method of fabricating an antenna system, the method comprising providing a cavity, and coupling a broadband antenna to the cavity, the broadband antenna including surfaces defining a slot, wherein a cross-section of the cavity defines a resonant frequency range of the slot, a plurality of transmission lines, wherein the plurality of transmission lines bridge the slot and are spaced apart at a sub-wavelength distance with respect to a target frequency range of the antenna system, and a plurality of inductive tuning elements, each inductive tuning element being disposed adjacent to one of the plurality of transmission lines, wherein the target frequency range is a function of the resonant frequency range and an impedance associated with the plurality of inductive tuning elements.

Example sixteen includes the method of example fifteen, wherein the sub-wavelength distance is a fraction of a highest frequency in the target frequency range.

Example seventeen includes the method of example sixteen, wherein the fraction is less than fifty percent.

Example eighteen includes the method of example fifteen, wherein the impedance includes an inductance value that is a function of a length of the plurality of inductive tuning elements.

Example nineteen includes the method of example eighteen, further including coupling a circuit to the plurality of inductive tuning elements, wherein the circuit is to adjust the inductance value.

Example twenty includes the method of example fifteen, further including incorporating a plurality of capacitive patches into the broadband antenna, wherein each capacitive patch is disposed adjacent to one of the tuning elements, and coupling each capacitive patch to an end of one of the plurality of transmission lines, wherein the impedance includes a capacitance value of the plurality of capacitive patches.

Example twenty-one includes the method of example fifteen, wherein the plurality of transmission lines include a multi-tap arrangement that enables dissipative losses to be recovered.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD (solid state drive)/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An antenna system comprising:

a cavity; and a broadband antenna coupled to the cavity, the broadband antenna including:

surfaces defining a slot, wherein a cross-section of the cavity defines a resonant frequency range of the slot, a plurality of transmission lines, wherein the plurality of transmission lines bridge the slot and are spaced apart at a sub-wavelength distance with respect to a target frequency range of the antenna system, and a plurality of inductive tuning elements, each inductive tuning element being disposed adjacent to one of the plurality of transmission lines, wherein the target frequency range is a function of the resonant frequency range and an impedance associated with the plurality of inductive tuning elements.

2. The antenna system of claim 1, wherein the sub-wavelength distance is a fraction of a highest frequency in the target frequency range.

3. The antenna system of claim 2, wherein the fraction is less than fifty percent.

4. The antenna system of claim 1, wherein the impedance includes an inductance value that is a function of a length of the plurality of inductive tuning elements.

5. The antenna system of claim 4, further including a circuit coupled to the plurality of inductive tuning elements, wherein the circuit is to adjust the inductance value.

6. The antenna system of claim 1, wherein the broadband antenna further includes a plurality of capacitive patches, each capacitive patch being coupled to an end of one of the plurality of transmission lines and disposed adjacent to one of the inductive tuning elements, and wherein the impedance includes a capacitance value of the plurality of capacitive patches.

7. The antenna system of claim 1, wherein the plurality of transmission lines include a multi-tap arrangement that enables dissipative losses to be recovered.

8. A method of fabricating an antenna system, the method comprising:

providing a cavity; and coupling a broadband antenna to the cavity, the broadband antenna including surfaces defining a slot, wherein a cross-section of the cavity defines a resonant frequency range of the slot, a plurality of transmission lines, wherein the plurality of transmission lines bridge the slot and are spaced apart at a sub-wavelength distance with respect to a target frequency range of the antenna system, and a plurality of inductive tuning elements, each inductive tuning element being disposed adjacent to one of the plurality of transmission lines, wherein the target frequency range is a function of the resonant frequency range and an impedance associated with the plurality of inductive tuning elements.

9. The method of claim 8, wherein the sub-wavelength distance is a fraction of a highest frequency in the target frequency range.

10. The method of claim 9, wherein the fraction is less than fifty percent.

11. The method of claim 8, wherein the impedance includes an inductance value that is a function of a length of the plurality of inductive tuning elements.

12. The method of claim 11, further including coupling a circuit to the plurality of inductive tuning elements, wherein the circuit is to adjust the inductance value.

13. The method of claim 8, further including:

incorporating a plurality of capacitive patches into the broadband antenna, wherein each capacitive patch is disposed adjacent to one of the tuning elements; and coupling each capacitive patch to an end of one of the plurality of transmission lines, wherein the impedance includes a capacitance value of the plurality of capacitive patches.

14. The method of claim 8, wherein the plurality of transmission lines include a multi-tap arrangement that enables dissipative losses to be recovered.

* * * * *